3,759,850
LACQUER EMULSION COMPOSITION FOR LITHOGRAPHIC PLATES
Donald Gregory Lehman, Rahway, N.J., assignor to Inmont Corporation, New York, N.Y.
No Drawing. Filed May 14, 1971, Ser. No. 146,579
Int. Cl. C08d 9/06; C08f 45/18; G03f 7/02
U.S. Cl. 260—17.4 ST       3 Claims

ABSTRACT OF THE DISCLOSURE

A lacquer emulsion composition for lithographic plates which has the following preferred composition by weight:

| | |
|---|---:|
| 14° Baumé aqueous gum arabic solution | 50.00 |
| Ethylene glycol | 5.00 |
| Phosphoric acid 85% | 4.00 |
| Fumed silica (Cab-O-Sil) | 1.00 |
| Water | 9.90 |
| Tween 60 surfactant | 0.10 |
| Cyclohexanone | 25.35 |
| Carbon black | 1.49 |
| Bakelite VYHH vinyl resin | 3.16 |
| | 100.00 |

Also, the method of preparing the composition, and the method of preparing exposed lithographic plates for printing comprising applying the above composition to the exposed plate.

BACKGROUND OF THE INVENTION

Field of the invention

This invention relates to the field of preparation of printing plates and more particularly to the preparation of lithographic plates. It is particularly applicable to preparation for printing of light-exposed diazo-sensitized lithographic plates.

Description of the prior art

The use of lacquer emulsions in the preparation of exposed lithographic plates in order to prepare them for printing is old and well known in the art as shown by U.S. Pats. 3,019,105 and 3,481,740. Furthermore, the use of lacquer emulsions containing vinyl copolymer materials is known in the art as also shown by U.S. Pat. 3,019,105. However, applicant has devised a lacquer emulsion composition which results in lithographic plates having significantly enhanced wear and solvent resistance properties as compared with other lithographic plates and particularly as compared with other lithographic plates employing vinyl copolymer materials.

SUMMARY OF THE INVENTION

The lacquer emulsion of this invention can comprise the following materials. All percents are by weight.

| | Percent |
|---|---:|
| Aqueous gum arabic solution (14° Bé.) | 40–60 |
| Lower alkylene glycol | 3–10 |
| Phosphoric acid (85%) | 1–5 |
| Acetic acid | 0–3 |
| Fumed silica (Cab-O-Sil) | 0.5–3 |
| Tween 60 surfactant | 0–1.0 |
| Cyclohexanone | 20–30 |
| Carbon black | 1–2 |
| Bakelite VYHH vinyl resin | 2–4 |
| Water | 0–20 |

A preferred formula is that shown in the abstract.

DESCRIPTION OF THE PREFERRED EMBODIMENT

The lacquer emulsion of this invention can comprise the following materials. All percents are by weight.

| | Percent |
|---|---:|
| Aqueous gum arabic solution (14° Bé.) | 40–60 |
| Lower alkylene glycol | 3–10 |
| Phosphoric acid (85%) | 1–5 |
| Acetic acid | 0–3 |
| Fumed silica (Cab-O-Sil) | 0.5–3 |
| Tween 60 surfactant | 0–1.0 |
| Cyclohexanone | 20–30 |
| Carbon black | 1–2 |
| Bakelite VYHH vinyl resin | 2–4 |
| Water | 0–20 |

A preferred lacquer emulsion composition for lithographic plates has the following composition by weight:

| | |
|---|---:|
| 14° Baumé aqueous gum arabic solution | 50.00 |
| Ethylene glycol | 5.00 |
| Phosphoric acid 85% | 4.00 |
| Fumed silica (Cab-O-Sil) | 1.00 |
| Water | 9.90 |
| Tween 60 surfactant | 0.10 |
| Cyclohexanone | 25.35 |
| Carbon black | 1.49 |
| Bakelite VYHH vinyl resin | 3.16 |
| | 100.00 |

The lacquer emulsions of this invention are prepared as set forth below.

The materials in the water phase are thoroughly dispersed together by conventional means prior to forming the emulsion. These are, in the preferred formula:

Gum arabic solution 14° Bé.
Ethylene glycol
Phosphoric acid
Fumed silica
Tween 60
Water In other formulae, Span 80 surfactant and acetic acid may be included in this phase.

A dispersion of pigment and resin in a solvent is prepared by any of several methods to form the lacquer or oil phase:

(1) Dispersion of all items in a ball mill.
(2) Dispersion of all items in a high speed mixer, such as a Cowles Dissolver or Eppenbach.
(3) Vinyl and pigment are dispersed together on a rubber mill. The resultant sheet of material is then broken into small chips and thoroughly mixed with solvent. This results in a dispersion of vinyl-coated pigment particles in a solution of vinyl resin in solvent.

The lacquer or oil phase, prepared by any of the above methods, is added slowly to the water phase under high shear agitation to form an emulsion of the oil-in-water type.

The formation of the oil phase by one of the above methods is believed to be critical to this invention. When the preferred third method is used, the thorough dispersion of the pigment in the vinyl on a rubber mill is believed to result in a very thorough coating of resin on each pigment particle, thus greatly increasing the toughness of the subsequently formed lacquer image.

The aqueous gum arabic solution is preferably 14° Bé., although it will be obvious to those skilled in the art that other specific gravities can be used if variations in the other constituents, such as the amount of water, are made.

Any lower alkylene glycol may be used, such as ethylene glycol, propylene glycol, diethylene glycol, and triethylene glycol. However, ethylene glycol is preferred.

Acetic acid may be substituted for up to about one-half of the specified amount of phosphoric acid, if desired.

Any single solvent or mixture of Bakelite VYHH solvents having an evaporation rate between about 20 and 35, based on the rate of evaporation of n-butyl acetate as 100, may be used. Examples of such solvents are amyl acetate, Pent-Oxone, and isophorone.

Numerous conventional pigments of all colors can be used, of which only two examples are cadmium red and phthalocyanine blue.

The water used is preferably distilled or deionized water.

Although Tween 60 surfactant is preferred, it will be obvious that other, similar conventional surfactants may also be used in place of or in addition to the Tween 60. Such surfactants must, however, be non-ionic and capable of forming oil-in-water type emulsions.

The superior wear properties of the lacquer emulsion of this invention, were illustrated by the results of a Scotch brand tape adhesion test on a lithographic plate prepared from the lacquer emulsion of this invention. In this test short sections of Scotch brand adhesive tape were applied to various portions of the lithographic plate image and surrounding areas. The tape was firmly pressed against the areas and then removed by pulling. The pieces of tape which were removed were placed on an unexposed section of the plate at the right of the figure. These pieces of tape clearly showed the absence of any substantial amounts of material removed from the image areas by the test.

By comparison, the same set up was made utilizing a lithographic plate prepared from the preferred lacquer emulsion described in U.S. Pat. 3,019,105. It was clearly seen that very substantial amounts of material were removed by the tape from the surface of the plate.

In another test, a lithographic plate using the preferred formula of this invention was wiped with common ink or plate solvents as described below: (1) a section of the plate was wiped with a piece of absorbent cotton saturated with dehydrated castor oil, (2) another section was similarly wiped with linseed oil. (3) A third section was wiped with lithotine solvent, (4) a fourth section was wiped with Magie 535 ink oil, a high boiling, low K. B. aliphatic hydrocarbon. It was readily apparent that there was little or no matter removed from the plate by wiping with these solvents, which are commonly encountered in lithographic printing.

By comparison, a lithographic plate prepared from the preferred lacquer emulsion material described in U.S. Pat. 3,019,105 was wiped in the same manner with the same respective solvents. It was clearly apparent that a very substantial amount of image material was removed from the plate by these commonly encountered solvents.

Wear tests were performed using an abrasive wheel on plates prepared using the preferred lacquer emulsion described in U.S. Pat. 3,019,105 and the preferred lacquer emulsion material of this invention. The wear tests were conventional 5-cycle and 10-cycle wear tests using a Calibrase abrasive wheel CS-17 on a Taber Abraser, Taber Instrument Company, Tonawanda, N.Y. It is strikingly evident that the material of this invention is much more difficult to wear away than that described in U.S. Pat. 3,019,105.

The superiority of applicant's lacquer emulsion is believed to be attributable to the combination of the use of a particular vinyl resin together with omission of plasticizer in the lacquer composition.

The resin used is Union Carbide's Bakelite Vinyl Solution Resin VYHH, which is a medium molecular weight copolymer of about 87% vinyl chloride and 13% vinyl acetate, by weight. Bakelite VYHH is further described in product literature available from Union Carbide under the titles Bakelite Vinyl Plastics Product Data—Bakelite Vinyl Solution Resin VYHH (J2195B,026-4) and Bakelite Resins for Surface Coatings, Temporary Technical Bulletin No. 228—"Bakelite" Vinyl Chloride-Acetate Resins for Solution Coatings, October 1957, which are incorporated herein by reference.

The use of this resin as a lacquer emulsion component is believed to be particularly unobvious since the above-referenced product literature states that it exhibits poor air-dry adhesion to almost all surfaces.

The use of this resin in lacquer emulsions without a plasticizer is believed to be still more unobvious in view of the fact that the above product literature recommends use of a plasticizer. Also, as shown by the patents referred to herein, plasticizers are normally used in resin-containing lacquer emulsions for lithographic plates.

Absence of plasticizer with this resin has resulted in harder, more solvent resistant, more wear resistant coatings on lithographic plates, but surprisingly has not significantly affected other desirable properties such as adhesion and flexibility.

The method of use of applicant's lacquer emulsion is conventional and is described in column 4, lines 10-30 of U.S. 3,481,740.

I claim:

1. A plasticizer-free oil-in-water emulsion for preparing exposed lithographic plates for printing consisting essentially of, by weight:

| | Percent |
|---|---|
| Aqueous gum arabic solution (14 degree Bé.) | 40-60 |
| Ethylene, diethylene, triethylene or propylene glycol | 3-10 |
| Phosphoric acid | 1-5 |
| Acetic acid | 0-3 |
| Fumed silica | 0.5-3 |
| Non-ionic surfactant | 0-1 |
| Copolymer of 87% vinyl chloride and 13% vinyl acetate | 2-4 |
| Solvent for the copolymer, having an evaporation rate between about 20 and 35 (N-butyl acetate) | 20-30 |
| Pigment | 1-2 |
| Water | 0-20 |

2. A plasticizer-free oil-in-water emulsion for preparing exposed lithographic plates for printing consisting essentially of, by weight:

| | Percent |
|---|---|
| 14 degree Bé. equeous gum arabic solution | 45-55 |
| Ethylene glycol | 4.5-5.5 |
| Phosphoric acid (55%) | 3.5-4.5 |
| Fumed silica | 0.9-1.1 |
| Non-ionic surfactant | 0-0.3 |
| Copolymer of 87% vinyl chloride and 13% vinyl acetate | 2.5-4 |
| Cyclohexanone | 22-28 |
| Pigment | 1-2 |
| Deionized water | 9-11 |

3. The emulsion of claim 2 wherein the pigment is carbon black.

References Cited

UNITED STATES PATENTS

| 2,754,279 | 7/1956 | Hall | 96—33 X |
| 2,865,873 | 12/1958 | Hodgins et al. | 96—33 X |
| 3,019,105 | 1/1962 | Adams | 96—33 |
| 3,019,106 | 1/1962 | Adams | 96—33 X |
| 3,351,008 | 11/1967 | Lincoln et al. | 96—33 X |

DAVID KLEIN, Primary Examiner

U.S. Cl. X.R.

96—33